May 9, 1961  G. SCOURTES  2,983,907
TELEMETERING SYSTEM
Filed Dec. 17, 1959  4 Sheets-Sheet 1
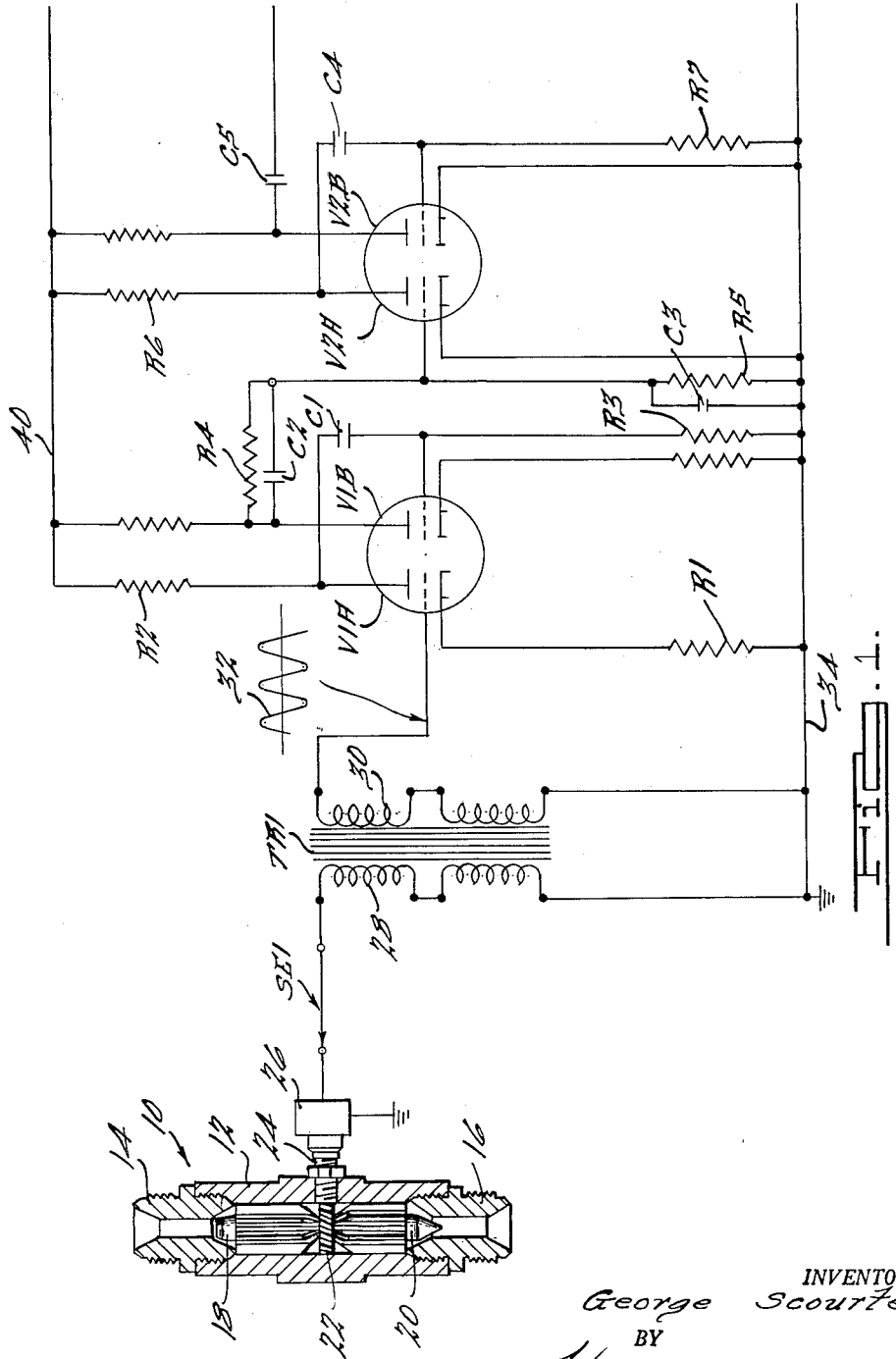
INVENTOR.
George Scourtes
BY
Harness, Dickey & Pierce
ATTORNEYS.

May 9, 1961 G. SCOURTES 2,983,907
TELEMETERING SYSTEM
Filed Dec. 17, 1959 4 Sheets-Sheet 2
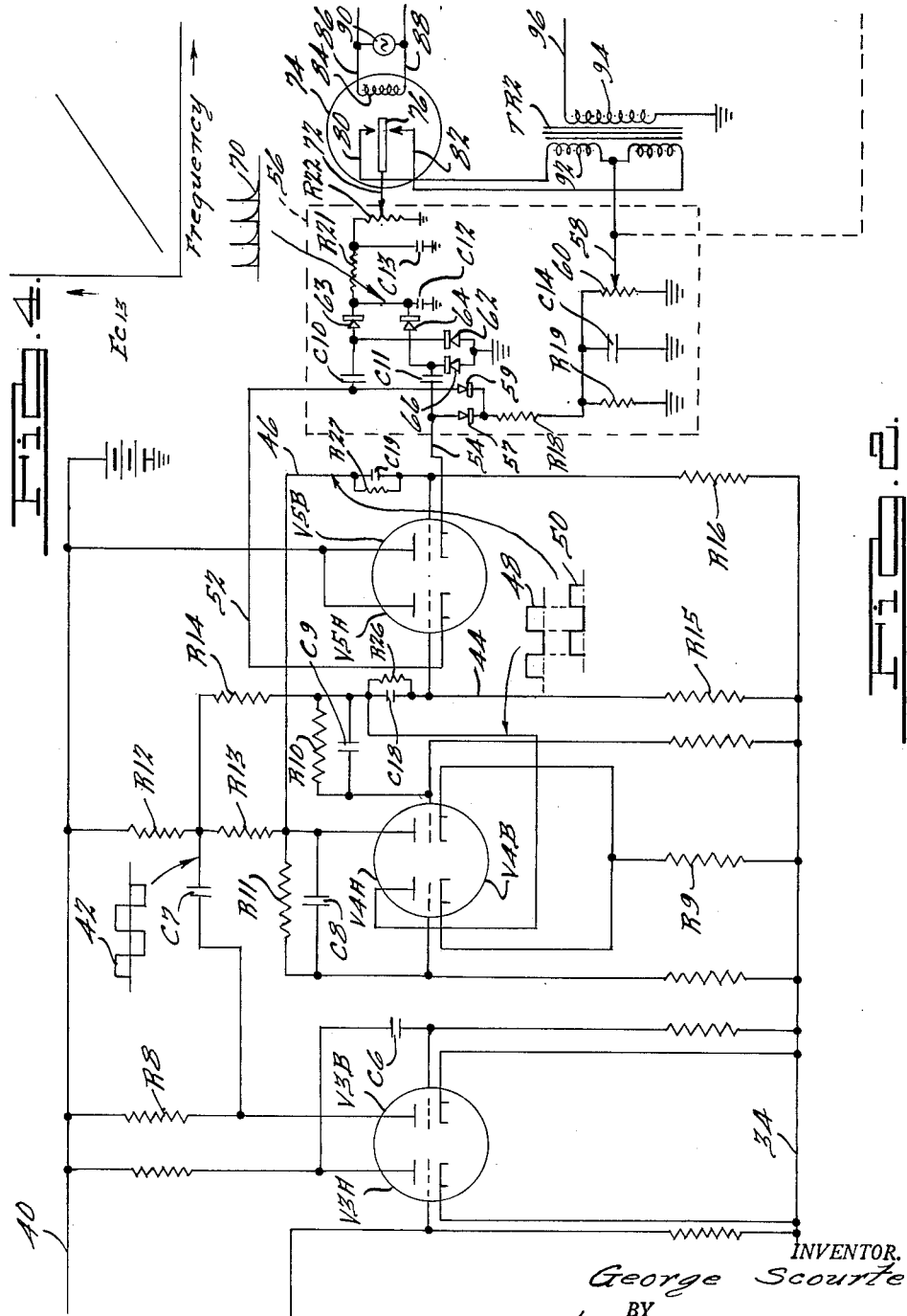
INVENTOR.
George Scourtes
BY
Harness, Dickey & Pierce
ATTORNEYS

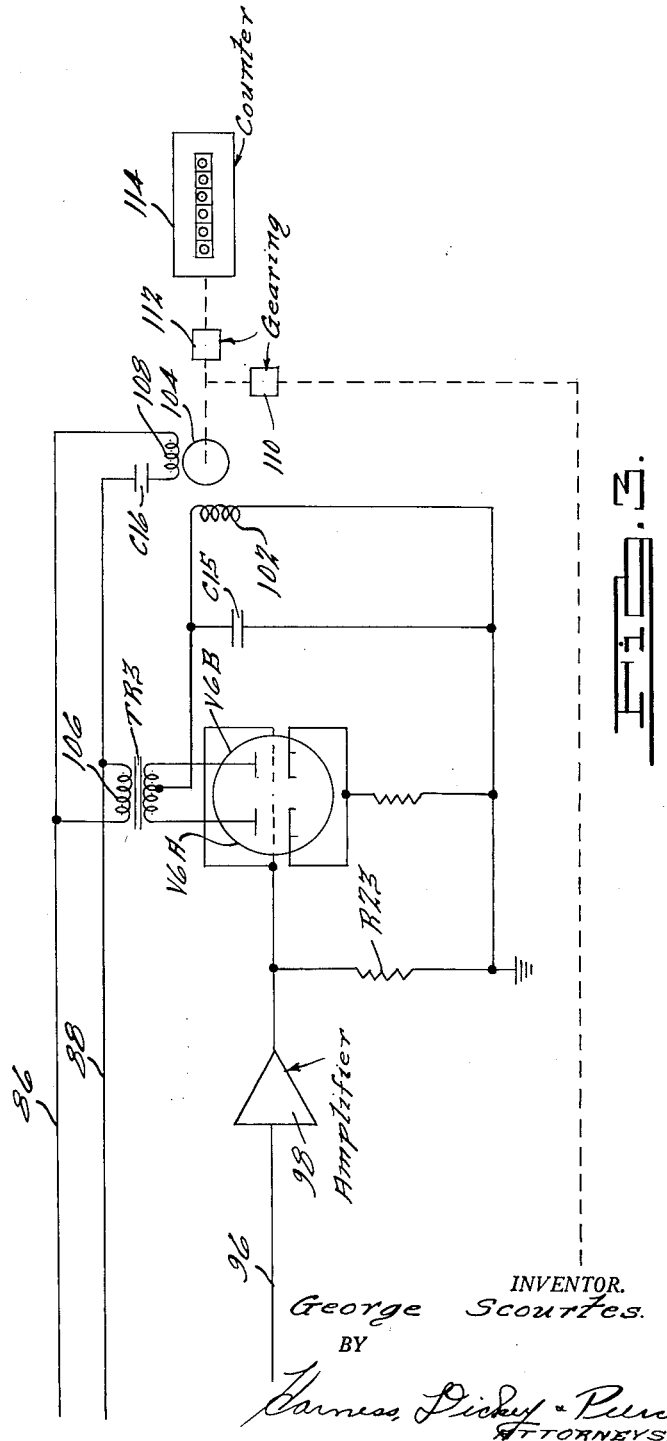

May 9, 1961
G. SCOURTES
2,983,907
TELEMETERING SYSTEM
Filed Dec. 17, 1959
4 Sheets-Sheet 4
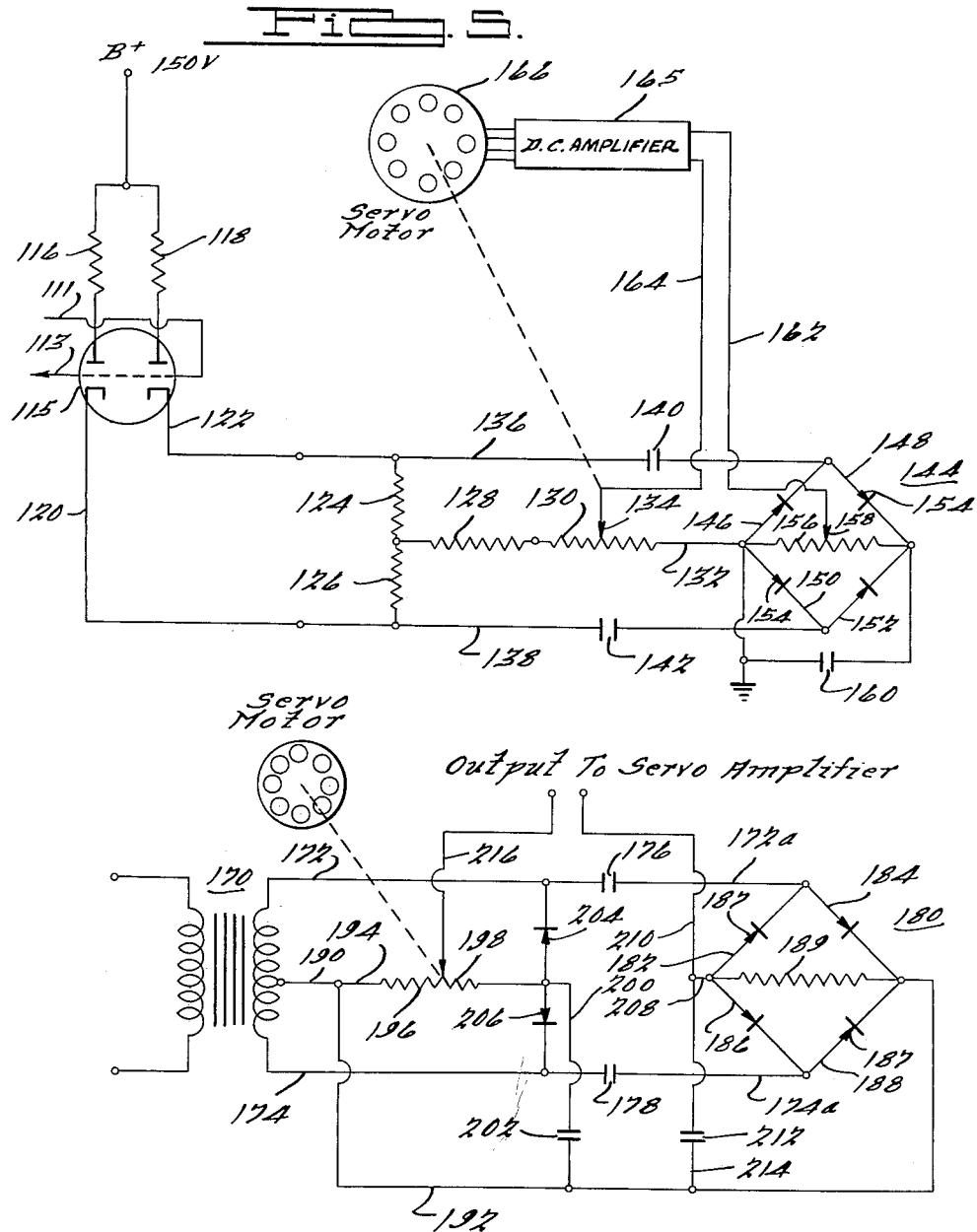
INVENTOR.
George Scourtes.
BY
Harness, Dickey + Pierce
ATTORNEYS.

United States Patent Office 2,983,907
Patented May 9, 1961

2,983,907
TELEMETERING SYSTEM

George Scourtes, Detroit, Mich., assignor to George L. Nankervis Company, Detroit, Mich., a corporation of Michigan Filed Dec. 17, 1959, Ser. No. 860,293
14 Claims. (Cl. 340—187)

This invention relates to telemetering systems and more particularly to the presenting of a continuous and direct indication of the magnitude of a variable charcateristic of a substance or object.

This application is a continuation-in-part of my application Serial No. 536,232, filed September 23, 1955, entitled "Frequency Measuring Device" and of my application Serial No. 648,359, filed March 25, 1957, entitled "Telemetering System."

The principles of the present invention are representatively embodied in an apparatus for presenting a continuous and direct indication of the rate of flow of a fluid through a conduit, although it will be appreciated from the description of that embodiment that those principles may readily be applied to the measuring and indicating of other variable conditions, including, for example, the pressure of a fluid, the rate of rotational or translational motion of an object, and, in general, any condition or characteristic which can be reflected, by the use of appropriate transducers, as a series of electrical pulses the frequency of which varies in accordance with changes in the condition or characteristic.

In one disclosed embodiment, a transducer or sensing device produces an alternating current signal of a frequency proportioned to the rate of rotation of a blade disposed in a conduit which carries a moving fluid. That signal, appropriately amplified and limited, is applied to a frequency converter, bridge or demodulator one function of which is to produce a direct-voltage output signal the magnitude of which varies as a function of the frequency of the input signal. Since the magnitude of that direct voltage also tends to vary with any changes in the amplitude of the input signal to the converter (resulting, for example, from power supply variations), additional means are provided for producing a second direct-voltage output signal the magnitude of which varies effectively exclusively as a function of variations in the converter input-voltage amplitude.

These dual signals are employed to control a servo motor through a balancing amplifier. To that end, electromechanical means are employed to convert these dual signals into a constant-frequency square-wave pulse train in which the pulse amplitude is determined by the difference between the amplitudes of those two direct-voltage signals and in which the phase is determined by the direction of that difference. That pulse train, after amplification, is then utilized to control a two-phase servo motor. The rotational speed of the motor varies, within limits, with the amplitude of the square-wave pulses and the direction of rotation is determined by the phase of those pulses. The servo motor drives means for reducing the difference between the aforesaid dual signals to zero, the attainment of that condition being sensible by the motor due to the resultant reduction in the magnitude of the aforesaid square-wave pulses to zero. To achieve that equality between the magnitudes of the dual signals, one of those dual signals is applied to the balancing amplifier through a potentiometer which is mechanically coupled to the motor through a gear train.

The balancing action is continuous so that the angular position of the motor shaft continuously reflects the frequency of the transducer signal and hence the instant state of the condition being measured. Consequently, an indicator, such as a plotter or a mechanical counter, may be driven by the motor to present a continuous numerical or graphical indication of the magnitude of the measured variable condition or characteristic.

In one arrangement disclosed herein, the current whose pulse frequency is to be measured is applied across the primary winding of a transformer. The output of the transformer is fed into two full wave rectifier circuits. The first rectifier circuit contains a pair of diodes and a suitable filter condenser. The output of such rectifier circuit is a direct current voltage whose amplitude is proportional to the alternating current input voltage without respect to frequency. The second rectifier circuit is connected to the transformer through two condensers whose resistive values are dependent upon the frequency of the current passing through them. The output of such second rectifier circuit will then be a direct current voltage whose amplitude is proportional to the alternating current input voltage and frequency. These two outputs are fed into a ratio sensitive device for measuring the ratio between the two outputs and reading in terms of frequency.

Another form of the invention is similar to the form above described but departs therefrom in that instead of employing a matching transformer the input is taken directly from the cathodes of a duo-triode cathode follower circuit in the output stage of a square wave amplifier. The input to the apparatus is in this case a series of positive pulses with respect to ground and 180° out of phase with each other from each cathode. These pulses are fed through a pair of resistors to a common resistor to ground and a direct current potential is thereby developed across the common resistor proportional in amplitude to the incoming pulses without respect to their frequency. The ratio sensitive device is now connected to this direct current potential and to the potential of the above-mentioned second rectifier circuit and the ratio between the voltages is measured as a function of the pulse frequency.

A more complete understanding of the principles of the invention may be obtained from the following detailed description of embodiments of the invention when read with reference to the accompanying drawings in which:

Figure 1 is a schematic representation of a portion of a measuring system embodying the principles of the present invention, including the transducer and a portion of the means for amplifying the transducer output signal;

Fig. 2, to be placed to the right of Fig. 1, is a schematic representation of an additional portion of the system, including additional amplifying means, a square-wave pulse generator and a converter;

Fig. 3, to be placed to the right of Fig. 2, is a schematic representation of another portion of the system, showing the balancing amplifier and the servo-motor equipment;

Fig. 4 is a graphical representation of certain electrical relationships in the system;

Fig. 5 is a schematic diagram of a slightly modified frequency converter arrangement; and Fig. 6 is a schematic diagram of a further modified frequency converter arrangement.

The apparatus disclosed in Figs. 1 to 4 is adapted to display continuously a representation of the rate of flow of a fluid through a conduit, that indication being either in terms of volume per unit time or in terms of weight per unit time. Consequently, the transducer 10 comprises a device for translating that rate of flow into an alternating current signal the frequency of which varies as a function of the rate of flow. Transducer 10 comprises a centrally bored body 12 provided with end fittings 14 and 16 for associating the unit with the fluid-carrying conduit. Vaned hubs 18 and 20 are disposed in spaced alignment with one another within the bore in the body 12, frictional engagement between the vanes and the inner wall of body 12 retaining the hubs in position. A multi-vaned rotor 22 is rotatably supported between hubs 18 and 20 by a shaft engaging a central aperture in one or both of those hubs. In practice, it has been found to be advantageous to form the rotor 22 integrally with the shaft and form the bearing surfaces within the hub or hubs.

A fitting 24 axially threaded in the body 12 accepts a pickup device 26. Suitable pickup devices are available on the commercial market and comprise a coil, a permanent magnet, and a pole piece extending into proximity to the vanes on the rotor 22. In practice the pole piece is normally formed as two elements one ferrous pin within the fitting 24 and the other, engageable by the first, sealed in the body 12 to prevent the fluid from contacting the coil and magnet assembly. The variation of the reluctance in the magnetic circuit produced as each vane of rotor 22 moves past the pole piece results in the generation of an alternating current signal. With selector switch SE1 in its shown position, the alternating signal will be applied across the primary winding 28 of input transformer TR1, one full cycle of that alternating signal being generated each time one of the vanes of rotor 22 passes the pickup device 26. The resultant signal impressed across the secondary winding 30 of transformer TR1, represented by curve 32 on Fig. 1 of the drawings, is approximately sinusoidal.

That voltage is applied between the control grid of vacuum tube V1A and the ground at conductor 34. The size of cathode resistor R1 is so selected in view of the tube characteristics, in view of the amplitude of the input signal, in view of the value of load resistor R2 and in view of the magnitude of the supply voltage appearing on conductor 40 that amplifier V1A serves as a limiter or clipper. The amplified and limited signal appearing at the anode of tube V1A is applied by a coupling network comprising capacitor C1 and resistor R3 to the control grid of amplifier limiter stage V1B, the output of which is in turn applied through a coupling network comprising capacitor C2 in parallel with the resistor R4 and capacitor C3 in parallel with resistor R5 to amplifier limiter V2A. The voltage variations appearing across load resistor R6 of stage V2A are applied through a coupling network comprising capacitor C4 and resistor R7 to amplifier limiter V2B. Similarly, the signal is amplified and limited by amplifier-limiter stages V3A and V3B, the output signal of the entire amplifier-limiter series appearing across load resistor R8 of tube V3B. It will be noted that these several stages are similar except that the cathodes of sections V2A, V2B, V3A and V3B are directly grounded via conductor 34.

Tubes V4A and V4B constitute, with their associated components, a form of Eccles-Jordan trigger circuit. The cathodes of sections V4A and V4B are connected to ground through a common cathode resistor R9, the anode of section V4A is connected to the control grid of section V4B through resistor R10 and capacitor C9, and the anode of section V4B is connected to the control grid of section V4A through a network including resistor R11 and capacitor C8. The source of operating potential on conductor 40 is applied to the tube sections through common resistor R12 and individual resistors R13 and R14. The voltage variations appearing across load resistor R8 of section V3B are applied through capacitor C7 to the junction of resistors R12, R13 and R14, the wave form of this signal, due to the amplifying and limiting action of the preceding stages being approximately a square wave train, as is represented in curve 42. Consequently, the trigger circuit comprising sections V4A and V4B will be triggered to the other of its two stable states at each positive-going transition of the input signal 42, it being recognized, of course, that the reference axis illustrated in connection with curve 42 is a positive value well above ground.

The resultant trigger circuit operation produces trains of square-wave pulses at the anodes of tubes V4A and V4B and hence at conductors 44 and 46. Those two pulse trains are equal in frequency but are 180 degrees out of phase with one another as is represented in curves 48 and 50. The pulses at conductor 44 are applied via a coupling network including capacitor C18 and resistors R26 and R15 to the control grid of cathode follower V5A, while the pulses at conductor 46 are applied via capacitor C19 and resistors R27 and R16 to the control grid of cathode follower V5B so that corresponding trains of square-wave pulses appear at conductors 52 and 54, respectively.

The signals on conductors 52 and 54 are applied to a frequency converter 56 which is somewhat similar to the apparatus disclosed in my copending application Serial No. 536,232 pertaining to a Frequency Measuring Device. The disclosure of that application is incorporated herein by reference and it is intended that that disclosure shall be a part of the subject application as fully as if it were reproduced in detail herein.

In general, the frequency converter 56 is designed to produce two discrete direct-voltage output signals, the magnitude of one of those signals being determined conjointly by the frequency and the amplitude of the input signals and the magnitude of the other direct voltage output signal being determined exclusively by the amplitude of the input signals.

To derive an output signal the magnitude of which varies exclusively with amplitude variations of the input signal, the square-wave trains appearing at conductors 52 and 54 are applied through unidirectional current conducting devices or rectifiers 57 and 59, respectively, and to ground through common resistor R18 and the common filter network comprising resistor R19 and capacitor C14. This filter network effectively integrates the input signals so that there appears across capacitor C14 a direct voltage the magnitude of which varies as a function of the amplitude of the signals appearing upon conductors 52 and 54. A selected portion of this direct voltage appears at the brush conductor 58 of the variable voltage divider or potentiometer 60.

To provide a direct-voltage output signal the magnitude of which varies with variations in the frequency and in the amplitude of the input signal, the signals on conductors 52 and 54 are applied to individual and common circuit components. Thus, the signal on conductor 52 is applied through capacitor C10 to the junction of unidirectional current conducting devices or rectifiers 63 and 62 while the signal on conductor 54 is applied through capacitor C11 to the junction of corresponding devices 64 and 66. These devices, representatively of the dry-disk type, are disclosed as having a low impedance to conventional current flow in the direction of the arrow and a high impedance to conventional current flow in the opposite direction. The lower terminals of devices 62 and 66 are connected directly to ground while the output terminals of devices 63 and 64 are connected to ground through a network including a shunt capacitor C12 connected to ground, a series resistor R21, and, in parallel with one another, a capacitor C13 and a resistor 61, the latter of which is provided with a brush or slider so as to act as a variable voltage divider or potentiometer.

The time constants are selected so that the circuit operates, in effect, to differentiate, rectify and integrate the input signal. Thus, at the positive-going leading edge of a positive square-wave voltage pulse at the cathode of tube V5A, the current through capacitor C10 rises effectively instantaneously to a high value and then falls, exponentially, towards zero, reaching a low value prior to the termination of the input pulse. When the input pulse abruptly terminates (that is, at the trailing edge of the positive square-wave pulse), capacitor C10 discharges, the rate of current flow being initially high and reducing towards zero exponentially.

Rectifier 63 presents a low impedance to the flow of the charging current and a high impedance to the flow of the discharging current, whereas rectifier 62 presents a high impedance to the flow of the charging current and a low impedance to the flow of the discharging current. Consequently, the voltage across capacitor C12 does not become negative with respect to ground and tends to appear (as far as the action of capacitor C10 is concerned) as a series of positive-going spikes at the frequency of the input square-wave signal. The circuit including capacitor C11 and rectifiers 64 and 66 acts similarly, but since the input signals are 180 degrees out of phase, the total voltage signal across capacitor C12 tends to appear as a series of positive-going spikes of a frequency twice that of either input signal from tube V5A or V5B, as is represented by curve 70, the amplitude of those spikes varying with the amplitude of the input signal at conductors 52 and 54.

The elements including capacitors C12 and C13 and resistors R21 and 61 serve as a filter for effectively integrating the pulses 70. Consequently, an effectively direct voltage appears across capacitor C13 and resistor 61, the magnitude of that voltage varying both with the magnitude and with the frequency of the input signal. The graph of Fig. 4 illustrates the relationship between the direct voltage across capacitor 13 and the frequency of the input signal for a constant-magnitude input signal.

The purpose of the provision of rectifiers 57 and 59 is to prevent the voltage appearing across capacitor C14 from being applied to capacitors C10 and C11 and from preventing those capacitors from becoming fully discharged during each off period of the input square-wave pulses.

As specific examples of appropriate representative parameters, for input signal frequencies in the range of 100 to 5000 cycles per second, capacitors C10 and C11 may have a value of 0.001 microfarad, resistor R21 may be 4,700 ohms, capacitors C12 and C13 may be 25 microfarads each, and potentiometer 61 may be 5000 ohms.

The dual direct-voltage outputs of frequency converter 56 are applied to an electromechanical converter or vibrator assembly, the amplitude controlled voltage appearing on conductor 58 and the other output being applied through variable resistor 61 to conductor 72. Vibrator 74 comprises a vibratile element 76 connected to conductor 72 and alternately moved into association with contacts connected to conductors 80 and 82 by actuating coil 84 connected by conductors 86 and 88 to a line source of alternating voltage 90. Conductors 80 and 82 are connected to the opposite ends of the primary winding 92 of transformer TR2, the center tap of that primary winding 84 being connected to conductor 58. When element 76 is in engagement with the contact connected to conductor 80, the magnitude of the current flow through the upper half of the primary winding 92 of transformer TR2 will be determined by the difference between the direct voltages appearing, at that instant, on conductors 72 and 58, and that same voltage difference will determine the magnitude of the current flow through the lower half of the primary winding of transformer TR2 when vibratile element 76 is in engagement with the contact connected to conductor 82. Consequently, there will appear across the secondary winding 94 of transformer TR2, and hence between conductor 96 and ground, a square-wave pulse train the frequency of which is constant and determined by the frequency of source 90 and the amplitude of which is determined by the difference between the voltages on conductors 72 and 58.

The voltage signal appearing across resistor R23 is applied to the control tube comprising sections V6A and V6B. That tube is connected to control the application of an alternating voltage to winding 102 of the two-phase servo motor 104. Primary winding 106 of transformer TR3 is connected across supply conductors 86 and 88, the ends of the secondary windings of that transformer are connected to the anodes of sections V6A and V6B, and the winding 102 of motor 104 is connected between the center tap of the secondary winding of transformer TR3 and ground. The line voltage appearing between conductors 86 and 88 is also applied through phase shifting capacitor C16 across winding 108 of motor 104. If the input signal to sections V6A and V6B has any effective magnitude, motor 104 will rotate, the direction of rotation being determined by the phase of that signal relative to the phase of the line voltage appearing between conductors 86 and 88. That phase relationship will, in turn, be determined by the direction of the difference between the voltages appearing between conductor 72 and ground and conductor 58 and ground, a shift in the direction of that difference producing a 180 degree phase shift of the signal 100.

The shaft of motor 104 is coupled through gearing 110 to the movable element or brush of variable voltage divider or potentiometer 60 in a manner well known in the art. The direction of rotation of motor 104 will be appropriate to move the brush of potentiometer 60 in a direction to minimize the difference between the voltages on conductors 58 and 72. Thus, if the voltage between conductor 58 and ground is less than that between conductor 72 and ground the brush of potentiometer 60 will be moved upwardly in the representation of Fig. 2 to increase the voltage between conductor 58 and ground, and conversely. Motor 104 will continue to rotate, moving the brush of potentiometer 60, until effective equality is achieved between the voltages on conductors 58 and 72, the attainment of that condition being reflected by a reduction in the magnitude of the voltage signal at sections V6A and V6B to zero, with a resultant deenergization of winding 102 of motor 104.

The shaft of motor 104 is also connected through gearing 112 to an indicating device, represented as a mechanically drivable continuous reading cyclometer mechanism or counter 114. With the unit calibrated by adjustment of variable resistor R22, counter 114 will present a continuous digital read-out or indication of the rate of flow of fluid through the flowmeter 10, the system being calibratable in terms of volume per unit time or in terms of weight per unit time, assuming the specific gravity of the measured fluid to be constant and determinable.

The selector switch SE1 shown in Fig. 1 of the drawings permits the system to be associated with any one of plural flowmeter devices 10 to provide plural ranges of measurement or to provide sequential measurement of the rate of flow of fluid in plural conduits. In the former case if the output frequency of several transducer devices varies greatly and beyond the normal range of the frequency converter 56, then means may be provided for shifting the time constant of the RC networks or, preferably, the frequency converters may be manufactured in the form of plug-in units which may be interchanged. Alternatively, a plurality of frequency converters 56 may be provided and selectively connected in circuit by switching means ganged with selector switch SE1.

It is contemplated, as an alternative arrangement, that potentiometer 61 be driven by a motor and that potentiometer 60 be but manually adjustable. If means are provided for either maintaining the amplitude of the signals on conductors 52 and 54 constant or if other means are provided for compensating for variations in the amplitude of those signals, the reference voltage, appearing across resistor 60 in the disclosed arrangement, may be constant.

In the embodiment of the invention shown in Fig. 5, the electric leads 111 and 113 are connected to the output side of a square wave amplifier (as shown for example in Figs. 1 and 2, tube 115 being a counterpart of tube V5A–V5B therein) and from which emanates the electrical pulses whose frequency is to be measured, while the other end of the leads 111 and 113 are connected to the grid circuits of a pair of cathode followers 115, which may be, for example, a 12AU7 duo-triode vacuum tube. A power supply (not shown) is connected to the B+ or plate circuit terminal of the tube to deliver substantially 150 volt current to the plates thereof. Whatever fluctuation that may occur in the 150-volt power supply and in the voltage of the grid circuit is compensated for in the following apparatus so that such fluctuation will not disturb an accurate measurement of the pulse frequency emanating from the square wave amplifier. A pair of 10,000 ohm resistors 116 and 118 may be connected in the plate circuit of the tube as shown.

The apparatus of Fig. 5 comprises a bridge circuit having one arm portion arranged to provide a parallel-series arrangement of resistors connected by leads 120 and 122 to the cathodes of tube 115. The said parallel-series arrangement specifically includes a pair of 10,000-ohm resistors 124 and 126 connected in parallel with a pair of series connected resistors 128 and 130 common to resistors 124 and 126 and which are grounded as by lead 132. Resistor 130 is a variable resistor having a movable contact 134 actuated automatically as hereinafter mentioned.

The other arm portion of the bridge is connected by the leads 136 and 138 through a pair of .001 micro-farad condensers 140 and 142 to opposite pairs of arms of a full wave rectifier bridge generally indicated at 144. The connection of leads 136 and 138 through the condensers 140 and 142 to the bridge 144 occur at the meeting point of arms 146 and 148 and at the meeting point of arms 150 and 152 of the rectifier bridge. In each arm of bridge 144 a diode, such as a silicon diode 154, is connected as shown. The rectifiers shown in Figs. 5 and 6 have been reversed from the showing of application Serial No. 536,232 to conform the showing to the convention employed in Figs. 1 to 4.

Across the opposite pairs of arms of bridge 144 from the pairs of arms connected by leads 136 and 138 is connected a manually variable resistor 156 of 5,000 ohms having a movable contact point 158. The meeting point of arms 146 and 150 of bridge 144 is connected to the lead 132 grounding the cathode resistor network. A 10 micro-farad condenser 160 may be connected across bridge 144 to act as a filter therefor.

By suitable leads 162 and 164 the movable contacts 134 and 158 are connected to a direct current amplifier 165. The amplifier is in turn connected to a servo motor 166. Leads 162 and 164 may be employed as the leads from box 56 in Fig. 2. The amplifier, because of its connection with the servo motor, may be termed a servo amplifier. The servo motor is mechanically coupled with contact 134 in any convenient manner to shift the contact in response to current flow from the amplifier.

In the operation of the system shown in Fig. 5, a square wave of any amplitude is fed to the grid circuits of the cathode followers 115 from the square wave amplifier, and it is the frequency of such square wave that is to be measured. A source of power for the plate circuit of the cathode followers of substantially 150 volts is delivered to the plates through the resistors 116 and 118. By virtue of the square wave impressed upon the grid circuits of the duo-triode tube 115 a matching square wave is set up in leads 120 and 122, with the pulses in leads 120 and 122 being positive with respect to ground and 180° out of phase with respect to each other. The square waves in leads 120 and 122 pass through resistors 124 and 126 and through the series resistors 128 and 130 to ground. Through the resistors 128 and 130 the square wave assumes a constant current characteristic as the half cycles of the square wave are matched, that is, the algebraic sum of the two combined square wave trains is a direct current the magnitude of which does not vary at the square-wave train frequency. The direct current potential across the common resistor 128–130 is proportional in amplitude to the incoming pulses but does not vary with their frequency. The balance of the current not passing through the noted resistor network 124–126–128–130 passes through the condensers 140 and 142, the capacitative reactances of which are dependent upon the frequency of the square wave trains, and to the bridge circuit 144. Bridge circuit 144 rectifies this current and creates a direct current potential across resistor 156 the amplitude of which is proportional to the frequency of the square wave trains appearing at conductors 111 and 113. This potential across resistor 156 is balanced against the potential appearing between movable contact 134 of variable voltage divider or resistor 130 and ground by the servo amplifier and servo motor effecting movement of contact 134 back and forth until the voltage difference between the movable contacts 134 and 158 equals a preselected value such as zero so that no current flows to the servo amplifier. Variations in the average amplitude of the square wave trains at conductors 136 and 138 will be reflected in a variation of the average voltage appearing across each of the resistors 130 and 156 and will accordingly be cancelled out since the amplifier 165 is responsive only to the difference between portions of the voltages developed across those two resistors. However, the amplitude of the direct voltage appearing across resistor 156 does vary with the frequency of the square wave trains while that across resistor 130 does not, so that the direct voltage applied to amplifier 165 will vary in amplitude in accordance with the changes of the frequency of the input signal.

In order to read the frequency of the pulses in terms of fluid flow where the apparatus is connected to a flow meter, a sweep hand traveling across a suitably calibrated dial may be connected to the servo motor.

A modification of the above-described embodiment of the invention is shown in Fig. 6 as including a center tapped transformer 170, the primary winding of which is connected to the source of unknown alternating current frequency. The secondary winding of that transformer is connected through leads 172 and 174 with .001 micro-farad condensers 176 and 178, and leads $172_a$ and $174_a$ connect the condensers with opposite arms of the full wave bridge rectifier indicated generally at 180. The lead $172_a$ is connected to the meeting point of arms 182 and 184 of bridge 180 while the lead $174_a$ is connected to the meeting point of arms 186 and 188 of the bridge. Diodes, such as silicon diodes 187, may be inserted in each arm of bridge 180 to rectify the current delivered thereto by leads $176_a$ and $178_a$.

A fixed resistor 189 of 5,000 ohms may be connected across bridge 180 as shown and across which resistance a direct current potential is established by the bridge.

The center tap of the secondary winding of the transformer 170 is connected by a lead 190, having a branch 192, to the meeting point of arms 182 and 186 of bridge 180, and another branch 194 of lead 190 is connected to a variable resistance 196 having a movable contact 198. The resistance 196 may have a value of 5,000 ohms. The other end of resistance 196 is connected by lead 200 through a condenser 202 with the branch 192. Condenser 202 may have a value of 10 micro-farads. A pair of diodes 204 and 206 are connected as shown between leads 172 and 174 and 200 to establish a direct current voltage across variable resistor 196.

The arms 184 and 188 of bridge 180 are connected at their meeting point by a lead 208 to the lead 210 extending between the condenser 212 and a direct current servo amplifier (not shown) such as mentioned hereinbefore. The other side of condenser 212 is connected by a lead 214 with branch lead 192. Condenser 212 may, in the circuit, be of a 10 micro-farad value.

Movable contact 198 of the variable resistor 196 is connected by a suitable lead 216 to the direct current servo amplifier above mentioned. The servo amplifier is connected with a servo motor as above discussed. The servo motor is mechanically connected to contact 198 to shift the same in response to energization of the servo motor. When a determined ratio in potential exists between the leads 210 and 216, the servo amplifier actuates the servo motor to move contact 198 until the ratio is again of a predetermined value. A suitable indicator is connected to the servo motor as, for example, a sweep hand and dial calibrated in terms of frequency, and when the potential difference between leads 210 and 216 is zero, the frequency of pulses emanating from the transformer can be read directly.

Because the frequency of the current in leads 172 and 174 is dependent upon the rotational velocity of the device the speed of rotation of which is to be measured as, for example, the rotor of a flowmeter, the dial over which the sweep hand moves may be calibrated either in terms of speed of rotation of the rotor or the fluid flow through the flowmeter. When the above-described frequency measuring systems are connected to other devices for measuring certain movements thereof the dial over which the sweep hand moves can be calibrated accordingly.

The values attributed to the resistances and condensers in the aforementioned circuits are illustrative only and it will be apparent to those skilled in the art that other values may be given them to suit other purposes without departing from the spirit of the invention.

It will also be apparent to those skilled in the art that transformer 170 could be eliminated along with diode 206, leads 174 and 174$_a$, condenser 178, and the arms 186 and 188 of bridge 180 in Fig. 2, with leads 172 and 190 being connected directly with the leads 218 and 220, so as to provide half-wave rectification of the signal.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a system for presenting a continuous indication of the magnitude of a variable characteristic, transducing means for producing an alternating current signal the frequency of which is controlled by the magnitude of the characteristic, means for converting said signal into a pair of out-of-phase trains of essentially square-wave pulses of a frequency controlled by the frequency of said signal, means responsive to both of said trains for producing a direct voltage the magnitude of which is controlled by the frequency of said trains, a reference voltage, a servo motor, an indicating mechanism driven by said motor, and means including said motor for continuously adjusting said voltages to a preselected relationship.

2. In a system for presenting a continuous indication of the magnitude of a variable characteristic, transducing means for producing an alternating current signal the frequency of which is controlled by the magnitude of the characteristic, means for amplifying and limiting said signal, means connected to said amplifying and limiting means for converting the amplified and limited signal into a pair of out-of-phase trains of essentially square-wave pulses of a frequency controlled by the frequency of said amplified and limited signal, means responsive to both of said trains for producing a direct voltage the magnitude of which is controlled by the frequency of said trains, a reference voltage, a servo motor, an indicating mechanism driven by said motor, and means including said motor for continuously adjusting said voltages to a preselected relationship.

3. In a system for presenting a continuous indication of the magnitude of a variable characteristic, transducing means for producing an alternating current signal the frequency of which is controlled by the magnitude of the characteristic, means for converting said signal into a pair of out-of-phase trains of essentially square-wave pulses of a frequency controlled by the frequency of said signal, means including differentiating and rectifying means responsive to both of said trains for producing a direct voltage the magnitude of which is controlled by the frequency of said trains, said rectifying means comprising a rectifier individual to each of said trains, said differentiating means comprising capacitative means individual to said trains and resistive means common to said trains, a reference voltage, a servo motor, an indicating mechanism driven by said motor, and means including said motor for continuously adjusting said voltages to a preselected relationship.

4. In a system for presenting a continuous indication of the magnitude of a variable characteristic, means including transducing means for producing an alternating current signal the frequency of which is controlled by the magnitude of the characteristic, means for producing a direct voltage the magnitude of which is controlled by the frequency and amplitude of said signal, means for producing a direct voltage the magnitude of which is controlled solely by the amplitude of said signal, a servo motor, an indicating mechanism driven by said motor, and means including said motor for continuously adjusting said voltages to a preselected relationship.

5. In a system for presenting a continuous indication of the magnitude of a variable characteristic, transducing means for producing an alternating current signal the frequency of which is controlled by the magnitude of the characteristic, means for converting said signal into a train of essentially square-wave pulses of a frequency controlled by the frequency of said signal, means for producing a first direct voltage the magnitude of which is controlled by the frequency and amplitude of said train, means for producing a second direct voltage the magnitude of which is controlled by the amplitude of said train, a servo motor, an indicating mechanism driven by said motor, and means including said motor for continuously adjusting said voltages to a preselected relationship.

6. In a system for presenting a continuous indication of the magnitude of a variable characteristic, transducing means for producing an alternating current signal the frequency of which is controlled by the magnitude of the characteristic, means for converting said signal into a train of essentially square-wave pulses of a frequency by the frequency of said signal, means including, differentiating and rectifying means for producing a first direct voltage the magnitude of which is controlled by the frequency and amplitude of said train, means including rectifying means for producing a second direct voltage the magnitude of which is controlled by the amplitude of said train, a servo motor, an indicating mechanism driven by said motor, and means including said motor for continuously adjusting said voltages to a preselected relationship.

7. In a system for presenting a continuous indication of the magnitude of a variable characteristic, transducing means for producing an alternating current signal the frequency of which is controlled by the magnitude of the characteristic, means for converting said signal into a train of essentially square-wave pulses of a frequency controlled by the frequency of said signal, means including differentiating, rectifying and filtering means for producing a first direct voltage the magnitude of which is controlled by the frequency and amplitude of said train, means including rectifying and filtering means for producing a second direct voltage the magnitude of which is controlled by the amplitude of said train, a servo motor, an indicating mechanism driven by said motor, and means including said motor for continuously adjusting said voltages to a preselected relationship.

8. In a system for presenting a continuous indication of the magnitude of a variable characteristic, transducing means for producing an alternating current signal the frequency of which is controlled by the magnitude of the characteristic, means for converting said signal into a pair of out-of-phase trains of essentially square-wave pulses of a frequency controlled by the frequency of said signal, means responsive to both of said trains and including differentiating and rectifying means for producing a first direct voltage the magnitude of which is controlled by the frequency and amplitude of both of said trains, means including rectifying means for producing a second direct voltage the magnitude of which is controlled by the amplitude of both of said trains, a servo motor, an indicating mechanism driven by said motor, and means including said motor for continuously adjusting said voltages to a preselected relationship.

9. In a system for presenting a continuous indication of the magnitude of a variable characteristic, transducing means for producing an alternating current signal the frequency of which is controlled by the magnitude of the characteristic, means for converting said signal into a pair of out-of-phase trains of essentially square-wave pulses of a frequency controlled by the frequency of said signal, means responsive to both of said trains and including differentiating, rectifying and filtering means for producing a first direct voltage the magnitude of which is controlled by the frequency and amplitude of both of said trains, said rectifying means comprising a rectifier individual to each of said trains, said differentiating means comprising capacitive means individual to said trains and resistive means common to said trains, means responsive to both of said trains and including rectifying and filtering means for producing a second direct voltage the magnitude of which is controlled by the amplitude of both of said trains, the last-mentioned rectifying and filtering means comprising a rectifier individual to each of said trains and capacitative and resistive means common to said trains, a servo motor, an indicating mechanism driven by said motor, and means including said motor for continuously adjusting said voltages to a preselected relationship.

10. In a system for presenting a continuous indication of the magnitude of a variable characteristic, transducing means for producing an alternating current signal the frequency of which is controlled by the magnitude of the characteristic, means for converting said signal into a train of essentially square-wave pulses of a frequency controlled by the frequency of said signal, means for producing a first direct voltage the magnitude of which is controlled by the frequency and amplitude of said train, means for producing a second direct voltage the magnitude of which is controlled by the amplitude of said train, a servo motor, mechanically drivable variable voltage divider means driven by said motor for varying the magnitude of one of said voltages, an indicating mechanism driven by said motor, and means including said motor and said voltage divider means for continuously adjusting said voltages to equality.

11. In a system for presenting a continuous indication of the magnitude of a variable characteristic, transducing means for producing an alternating current signal the frequency of which is controlled by the magnitude of the characteristic, means for converting said signal into a train of essentially square-wave pulses of a frequency controlled by the frequency of said signal, means including differentiating, rectifying and filtering means for producing a first direct voltage the magnitude of which is controlled by the frequency and amplitude of said train, means including rectifying and filtering means for producing a second direct voltage the magnitude of which is controlled by the amplitude of said train, a servo motor, mechanically drivable variable voltage divider means driven by said motor for varying the magnitude of one of said voltages, an indicating mechanism driven by said motor, means including said motor and said voltage divider means for continuously adjusting said voltages to equality, and adjusting means comprising a variable resistor controlling the other one of said voltages.

12. Apparatus for measuring the frequency of an alternating current voltage having two parts 180° out of phase comprising: a pair of condensers each connected to one part of said alternating current voltage, a bridge rectifier having two opposite pairs of arms connected to said condensers, a resistance connected across the other two pairs of opposite arms of the bridge rectifier, means connected to the alternating current voltage and operable to produce a direct current the amplitude of which is proportional to the amplitude of the alternating current input voltage, and a ratio sensitive potential measuring device connected to the output of said means and to said bridge to measure the ratio between the respective voltages thereof.

13. Apparatus for measuring the frequency of an alternating current voltage having two parts equal in amplitude and opposite in phase, a pair of cathode followers having grid circuits connected to the respective parts of said voltage, each of said cathode followers having a cathode, a source of plate potential for said cathode followers, a pair of serially connected equal-value resistors interconnecting said cathodes, resistance means connected between the junction of said resistors and one terminal of said source, said cathode followers and said resistors producing a direct voltage across said resistance means having an amplitude which is directly proportional solely to the amplitude of said alternating current voltage, an additional resistor, means including a capacitor connected to each of said cathodes and rectifying means connected between said capacitors and said additional resistor for producing across said additional resistor a direct voltage having an amplitude which is directly proportional both to the amplitude and to the frequency of said alternating current voltage, and means responsive to the difference between said direct voltages.

14. The combination of claim 13 in which one terminal of said additional resistor is connected to said one terminal of said source and in which a filter capacitor is connected between the other terminal of said additional resistor and said one terminal of said source.

References Cited in the file of this patent

UNITED STATES PATENTS

| 682,351 | Chesney et al. | Sept. 10, 1901 |
| 1,902,496 | Fitzgerald | Mar. 21, 1933 |
| 2,119,389 | Hunt | May 31, 1938 |
| 2,190,513 | Fyler | Feb. 13, 1940 |
| 2,476,025 | Clark | July 12, 1949 |
| 2,669,697 | Olesen | Feb. 16, 1954 |

FOREIGN PATENTS

| 763,503 | Great Britain | Dec. 12, 1956 |